(12) United States Patent
Landes et al.

(10) Patent No.: US 10,787,109 B2
(45) Date of Patent: Sep. 29, 2020

(54) SYSTEM AND METHOD FOR OPERATING A BALLAST CAR HOPPER DOOR

(71) Applicant: Herzog Railroad Services, Inc., St. Joseph, MO (US)

(72) Inventors: Nathan A. Landes, St. Joseph, MO (US); Khristopher R. Wall, St. Joseph, MO (US); Stephen Bedingfield, Savannah, MO (US); Douglas P. Thornton, St. Joseph, MO (US); Patrick R. Harris, Lenexa, KS (US)

(73) Assignee: Herzog Railroad Services, Inc., St. Joseph, MO (US)

( * ) Notice: Subject to any disclaimer, the term of this patent is extended or adjusted under 35 U.S.C. 154(b) by 471 days.

(21) Appl. No.: 15/790,664

(22) Filed: Oct. 23, 2017

(65) Prior Publication Data

US 2018/0134201 A1    May 17, 2018

Related U.S. Application Data

(60) Provisional application No. 62/420,695, filed on Nov. 11, 2016.

(51) Int. Cl.
*B60P 1/56* (2006.01)
*E01B 27/02* (2006.01)
*F15B 21/08* (2006.01)

(52) U.S. Cl.
CPC ............... *B60P 1/56* (2013.01); *E01B 27/02* (2013.01); *F15B 21/08* (2013.01)

(58) Field of Classification Search
CPC ............ B60P 1/56; E01B 27/00; E01B 27/02
See application file for complete search history.

(56) References Cited

U.S. PATENT DOCUMENTS

| | | |
|---|---|---|
| 3,596,565 A | 8/1971 | Atkinson |
| 4,326,750 A | 4/1982 | Rosenbaum |
| 4,478,129 A | 10/1984 | Hannes et al. |
| 4,542,701 A | 9/1985 | Fischer et al. |
| 4,656,457 A | 4/1987 | Brausfeld et al. |
| 5,284,097 A | 2/1994 | Peppin et al. |
| 5,311,822 A | 5/1994 | Bounds |
| 5,359,942 A | 11/1994 | Ward |
| 5,423,268 A | 6/1995 | Bounds |
| 5,586,669 A | 12/1996 | Seay et al. |
| 5,657,700 A | 8/1997 | Bounds |

(Continued)

FOREIGN PATENT DOCUMENTS

| | | |
|---|---|---|
| EP | 3150765 A1 | 4/2017 |
| WO | 2006009632 A2 | 1/2006 |

(Continued)

*Primary Examiner* — Jason C Smith
(74) *Attorney, Agent, or Firm* — Erickson Kernell IP, LLC; Kent R. Erickson

(57) ABSTRACT

A system and method for operating a ballast car hopper door includes logic and control circuitry, a hydraulic actuator, a door position sensor, and one or more sensors operable to measure system operational parameters. During normal operation of the hopper door the logic and control circuitry records the system operational parameters. In the event of failure, or absence, of the door position sensor the control circuitry compares real-time data to recorded data to maintain operation and correct positioning of the hopper door.

19 Claims, 5 Drawing Sheets

(56) References Cited

U.S. PATENT DOCUMENTS

| | | | |
|---|---|---|---|
| RE36,685 E | 5/2000 | Bounds | |
| 6,142,059 A | 11/2000 | Chan et al. | |
| 6,416,133 B2 | 7/2002 | Friesen | |
| 6,526,339 B1 * | 2/2003 | Herzog | B61L 25/025 105/311.1 |
| 7,059,238 B2 | 6/2006 | Albright et al. | |
| 7,152,347 B2 | 12/2006 | Herzog et al. | |
| 7,328,661 B1 | 2/2008 | Allen et al. | |
| 7,367,272 B2 | 5/2008 | Taylor | |
| 7,552,671 B2 | 6/2009 | Neumann | |
| 7,707,944 B2 | 5/2010 | Bounds | |
| 7,980,636 B2 * | 7/2011 | Miller | B60P 1/56 298/29 |
| 8,256,850 B1 | 9/2012 | O'Canna | |
| 8,596,203 B2 | 12/2013 | Forbes et al. | |
| 8,781,655 B2 | 7/2014 | Landes et al. | |
| 8,950,340 B2 | 2/2015 | Wang et al. | |
| 9,051,695 B2 | 6/2015 | Landes et al. | |
| 9,346,473 B1 | 5/2016 | Herzog et al. | |
| 2001/0002766 A1 * | 6/2001 | Friesen | B60P 1/56 298/27 |
| 2007/0079726 A1 | 4/2007 | Creighton et al. | |
| 2015/0057851 A1 | 2/2015 | Turner et al. | |
| 2016/0101790 A1 | 4/2016 | Forbes et al. | |
| 2018/0134201 A1 * | 5/2018 | Landes | B60P 1/56 |

FOREIGN PATENT DOCUMENTS

| | | |
|---|---|---|
| WO | 2012092747 A1 | 7/2012 |
| WO | 2016073749 A1 | 5/2016 |

* cited by examiner

SYSTEM AND METHOD FOR OPERATING A BALLAST CAR HOPPER DOOR

CROSS-REFERENCE TO RELATED APPLICATIONS

This application claims the benefit of U.S. Provisional Patent Application No. 62/420,695, filed Nov. 11, 2016, the disclosure of which is hereby incorporated herein in its entirety by reference.

BACKGROUND

Conventional railroads in the United States and elsewhere are typically formed by a compacted sub-grade, a bed of gravel ballast, wooden or concrete cross-ties positioned upon and within the ballast, and parallel steel rails secured to the ties. Variations of construction occur at road and bridge crossings and in other circumstances. The ballast beneath and between the ties stabilizes the positions of the ties, keeps the rails level, and provides some cushioning of the composite structure for loads imposed by rail traffic. However, vibrations from the movement of tracked vehicles over the rails and weathering from wind, rain, ice, and freeze and thaw cycles all contribute to compacting, dislodging, and displacement of some of the ballast over time. Thus, in addition to other maintenance activities, it is necessary to replace ballast periodically to maintain the integrity and safety of railroads.

Replacement ballast is typically delivered or distributed to the areas along a track in which it is needed using specially designed ballast hopper cars that include a hopper structure holding a quantity of ballast, a ballast chute at the bottom of the hopper in fluid communication with the hopper, and at least one power operated ballast hopper door positioned in the chute. The power operated hopper door typically includes a linear hydraulic actuator controlled via logic control circuitry to selectively open or close the door to control the discharge of ballast. The hopper door is pivotably attached, with an upper end and a distal end of the door moving in opposite directions about the pivot point as the actuator rotates the door between desired positions.

In typical operation the door is moveable between: a mid, closed position in which the upper end of the door blocks the chute opening so that no ballast can exit the hopper; an open, inboard position in which the distal end of the door is positioned inboard such that ballast is directed from the chute towards the inside of the car, between the rails; and an open, outboard position in which the distal end of the door is positioned outboard such that ballast is directed from the chute towards the outside of the car.

Typical ballast hopper cars include a front hopper and a rear hopper, with each hopper having two transversely spaced doors, one to the left side of the car and one to the right. Thus, each ballast hopper car typically includes four separate hopper doors to control the discharge of ballast. Each hopper door is independently controlled to discharge ballast outside the rails on the left and/or the right sides of the hopper car, or between the rails, as desired and as controlled by the logic and control circuitry.

Because railroad companies typically maintain hundreds or thousands of miles of track on a recurring schedule, the ballast replacement component of track maintenance is typically a major undertaking in terms of equipment, materials, traffic control, labor, and management. Thus, reliable operation of the ballast hopper doors is essential to the efficient and effective operation of the ballast distribution process.

SUMMARY

Embodiments of the invention are defined by the claims below, not this summary. A high-level overview of various aspects of the invention is provided here to introduce a selection of concepts that are further described in the Detailed-Description section below. This summary is not intended to identify key features or essential features of the claimed subject matter, nor is it intended to be used in isolation to determine the scope of the claimed subject matter. In brief, this disclosure describes, among other things, systems and methods for operating a ballast car hopper door in the event of failure or absence of a hopper door position sensor.

In one embodiment, the hopper door system includes a hydraulic linear actuator operable between extended and retracted positions, with hydraulic pressure supplied by a hydraulic pump system. The actuator is coupled to the hopper door by a linkage mechanism such that movement of the actuator main ram is translated to movement of the hopper door. Logic and control circuitry provides command signals to an electro hydraulic servo valve which in turn directs hydraulic pressure to the actuator to achieve a desired hopper door position. A position sensor mounted in or on the actuator, hopper door, or linkage mechanism provides an electrical signal to the logic and control circuitry corresponding to a position of the hopper door.

In addition to the actuator position sensor, the system includes at least one pressure sensor operable to measure hydraulic system pressure. The sensors are in communication with the logic and control circuitry and provide an electrical signal corresponding to the respective parameter. In alternative embodiments, the system includes a temperature sensor operable to measure the ambient temperature in which the system is operating, additional pressure and flow sensors to measure hydraulic system parameters at additional locations in the hopper door hydraulic systems, and limit switches operable to detect positions of mechanical components.

In one aspect, the hopper door system is operable to detect a failure of the door position sensor. A position sensor failure can be detected by logic and control circuitry sensing an open or short circuit in the position sensor circuitry, sensing a failure of supply voltage to the sensor, sensing an out of range signal or reading from monitored position sensor data, or sensing that the position sensor signal or data does not change when the actuator has been commanded to move.

In another aspect, during normal operation of the hopper door system the logic and control circuitry monitors data from the various sensors, including the door position sensor and the hydraulic pressure sensor, and logs or records that system parameter data into memory. In conjunction with the system parameter data, the logic and control circuitry records a time signal to allow the recorded data points to be temporally correlated so that a timeline of system parameter data over the course of a particular command and operation is established. For example, upon commanding the hopper door to open inwardly from a closed position, the logic and control circuitry monitors and records a time signal along with system parameter data from the door position sensor, the hydraulic pressure sensor, and other system sensors.

The recorded data is stored locally for further access by the logic and control circuitry, and can be offloaded to an external storage device and/or to a computer or database for further review and analysis.

In yet another aspect, in the event of a detected failure of the door position sensor, or in the absence of a door position sensor, the logic and control circuitry operates and determines the position of the hopper door by comparing real-time system parameters to previously recorded system parameter data and discerning that the real-time data correlates to that recorded data, indicating that the desired hopper door operation was performed. For example, using system parameter data recorded during normal operation of the hopper door being commanded to its open inwardly position, the logic and control circuitry commands the door to the open inwardly position and compares the real-time system parameter data—e.g., time and pressure—to the previously recorded data for that operation. If the real-time system parameter data correlates within a predetermined tolerance to the recorded system parameter data, the logic and control circuitry ascertains that the desired command was performed correctly, and the door moved to the open inwardly position. In alternative embodiments, the logic and control circuitry uses predetermined default values in place of recorded system parameter data.

Thus, operation of the hopper door and determination of the door's position can be attained in the event of failure of the actuator position sensor. In alternative embodiments, the door position sensor is eliminated entirely from the system and operation of the hopper door is effected via the logic and control circuitry using system parameter data from other system sensors.

DESCRIPTION OF THE DRAWINGS

Illustrative embodiments of the invention are described in detail below with reference to the attached drawing figures, and wherein.

DETAILED DESCRIPTION

The subject matter of select embodiments of the invention is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms "about" or "approximately" as used herein denote deviations from the exact value in the form of changes or deviations that are insignificant to the function.

Embodiments of the invention include apparatus, systems, and methods for controlling the operation of a ballast car hopper door. Various embodiments employ various techniques for detecting the operability of a hopper door position sensor, monitoring and recording hopper door system parameter data, and comparing real-time system parameter data during operation of the hopper door with previously recorded and/or stored system parameter data to operate the hopper door and determine its position.

Figure 1:
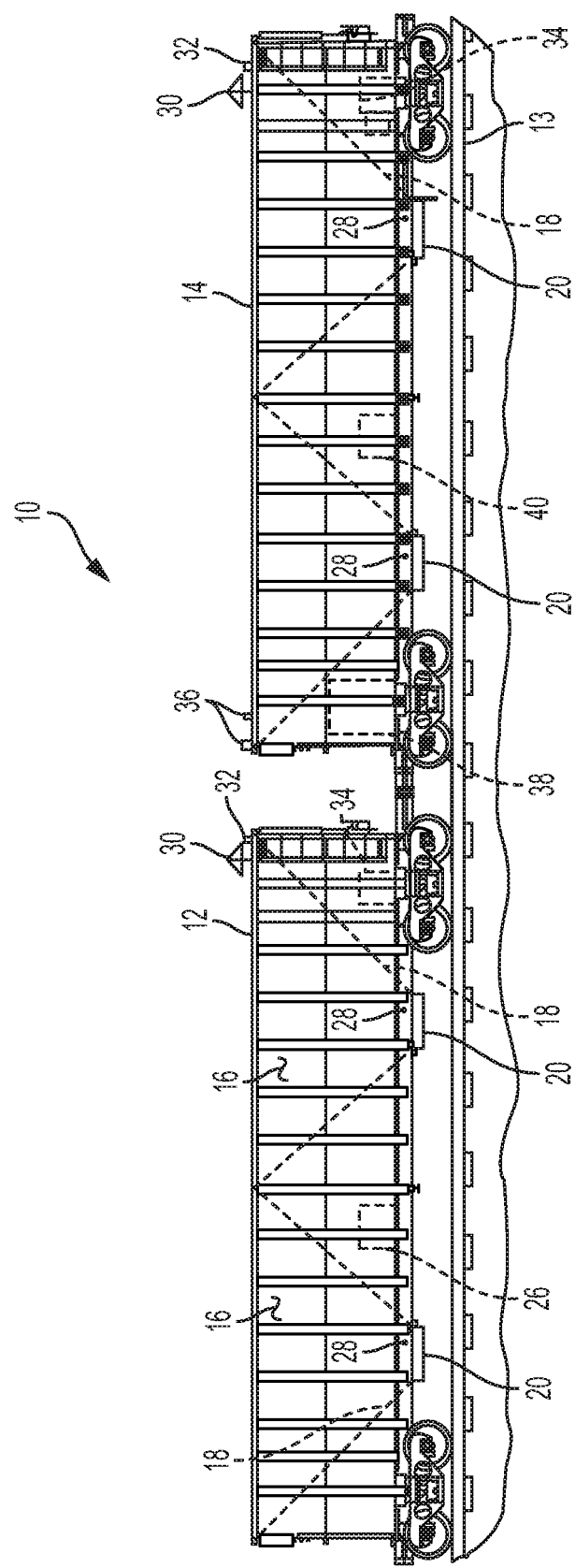
FIG. 1 is a side elevational view of a hopper car and a control car for distributing ballast depicted in accordance with an exemplary embodiment of the present invention.
Figure 2:
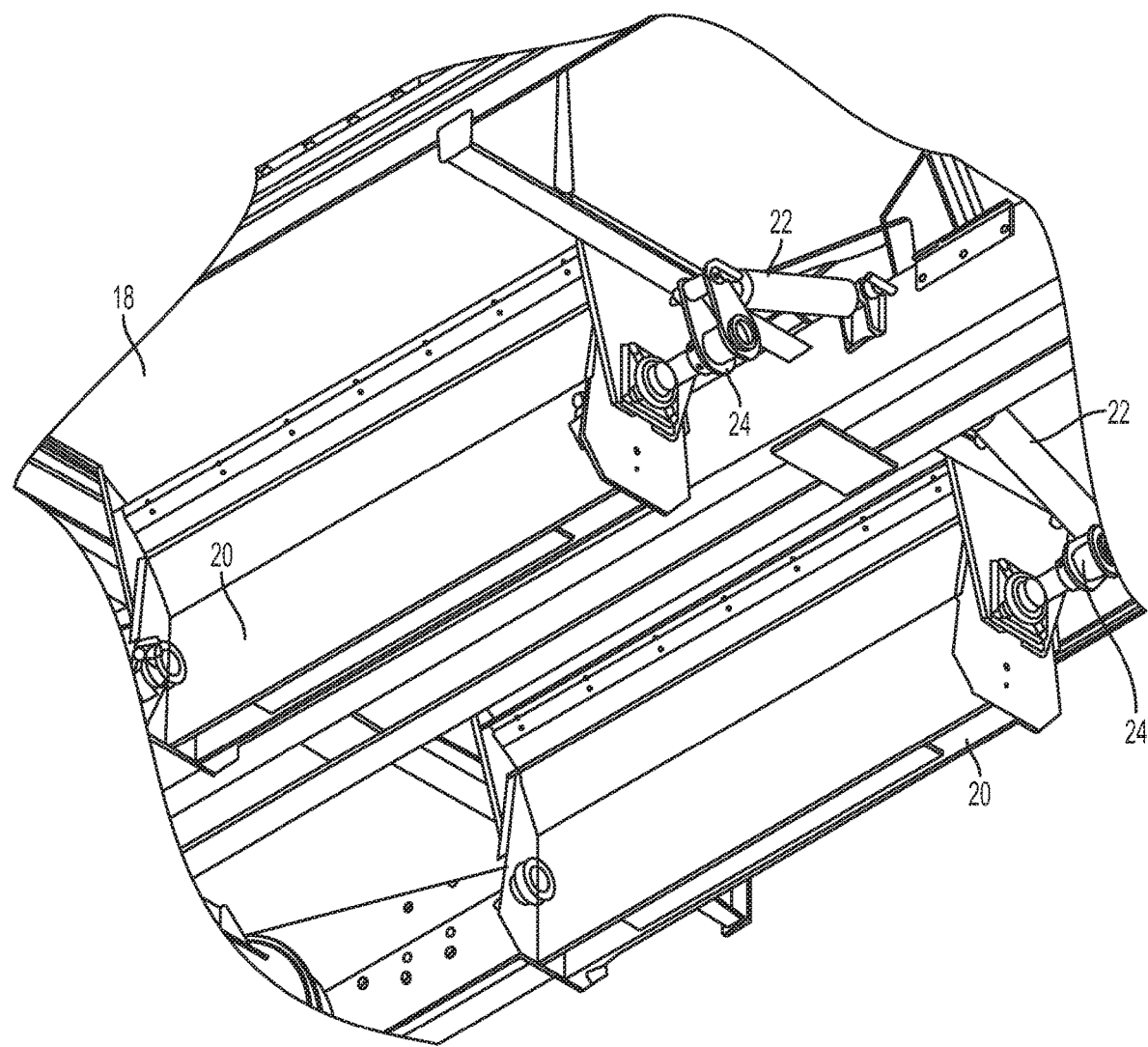
FIG. 2 is an enlarged fragmentary perspective view of two ballast discharge chutes associated with a hopper of the hopper car and each including a ballast door and actuator depicted in accordance with an exemplary embodiment of the present invention.

Looking first to FIGS. 1 and 2, a portion of a ballast delivery consist 10 includes a hopper car 12 and a control car 14. The hopper car 12 and control 14 are typically a part of a larger consist comprising a plurality of hopper cars and control cars, with at least one power or propulsion unit for propelling the consist along a railway 13. In one embodiment, the consist includes one control car 14 for approximately each thirty hopper cars 12, although other ratios may be employed.

Each hopper car 12 includes two longitudinally adjacent hoppers 16, with left and right ballast chutes 18 formed at the lower portion of each hopper 16. The sloped configuration of the hoppers 16 and chutes 18 directs ballast in the chute downwardly towards the bottom of the car for disbursement along a rail track.

An elongated, pivotably mounted ballast door 20 is positioned at the bottom of each chute 18 and is operable to control the flow of ballast from the respective chute. When the door 20 is positioned at its midpoint, the upper portion of the door is positioned to cover the bottom opening of the ballast chute 14 to prevent ballast from exiting the hopper 16. When the upper end of the door 20 is rotated inwardly, towards the inside of the car with the lower end of the door 20 angled outward relative to the car, the bottom opening of the ballast chute 18 is uncovered so that ballast falls from the chute and onto the outwardly sloping ballast door 20 which directs the downwardly flowing ballast toward the outside of the car. And, when the upper end of the door 20 is rotated outwardly, towards the outside of the car with the lower end of the door 20 angled inward relative to the car, the bottom opening of the ballast chute 18 is uncovered so that ballast falls from the chute and onto the inwardly sloping ballast door 20 which directs the downwardly flowing ballast toward the inside of the car, between the rails.

Each door 20 is operated by hydraulically powered linear actuator 22 connected to a rotatable linkage mechanism 24 extending from one end of the door 20. The linkage mechanism 24 translates the linear movement of the actuator 22 to rotational movement of the door 20, moving the door 20 between its open and closed positions as the actuator 22 is extended and retracted.

Each hopper car 12 includes logic and control circuitry 26 operable to command and control the operation of the actuator 22 to open and close the hopper door 20, and to monitor a door position signal from the actuator 22, and from other system sensors and parameters, as will be described in more detail below. The logic and control circuitry 26 may be standalone circuitry configured to control and operate just the hopper door system, or the circuitry may be a part of a car control unit or CCU that controls and/or monitors the operation of multiple systems on the car.

Most preferably, the logic and control circuitry includes one or more processors operable to execute a series of programmed instructions and one or more memory devices operable to store programmed instructions for execution by the circuitry, and one or more memory devices operable to store system data parameters obtained by the logic and control circuitry monitoring the various sensors in the system.

Each hopper car 12 and control car 14 may include solar panels 30 and batteries 34 to supply power to the logic and control circuitry or CCU, or to other systems located on the car. The control car 14 may include one or more generators 38 configured to supply power to the car, with a wiring bus between cars operable to distribute power along the consist. Each car may further include a GPS receiver 32 positioning system operable to provide a geographic location of the car.

As depicted in FIG. 1, the control car 14 is configured similarly to the hopper car 12, and may function as a hopper car for ballast distribution, except that the control car includes a master controller 40 in communication with a plurality of hopper cars 12 via their respective CCUs. In one exemplary embodiment, the logic and control circuitry 26 on the hopper car 12 is in communication with the master controller 40 which provides commands to the logic and control circuitry 26 to operate the hoper doors so that ballast is distributed along the track as commanded.

The master controller 40 preferably includes a computing device having information compiled from a spreading survey or other information relating to a desired disbursement of ballast and the current location of the hopper car so that ballast can be distributed from the hopper car in the desired manner. Most preferably the master controller 40 is in communication with one or more navigation systems 34 located on at least one of the cars, the consist may further include other communications components 36 configured to transmit and receive data over satellite, cellular, radio, telephone, or other long and/or short range communications networks.

Communication between the master controller 40 and the logic control circuitry 26 may be through a communications bus or wireline, or may be via other wired or wireless means. Thus, upon command from the logic and control circuitry, any of the hopper door actuators may be commanded to direct the associated hopper door to an open or closed position to achieve the desired disbursement of ballast.

Figure 3:
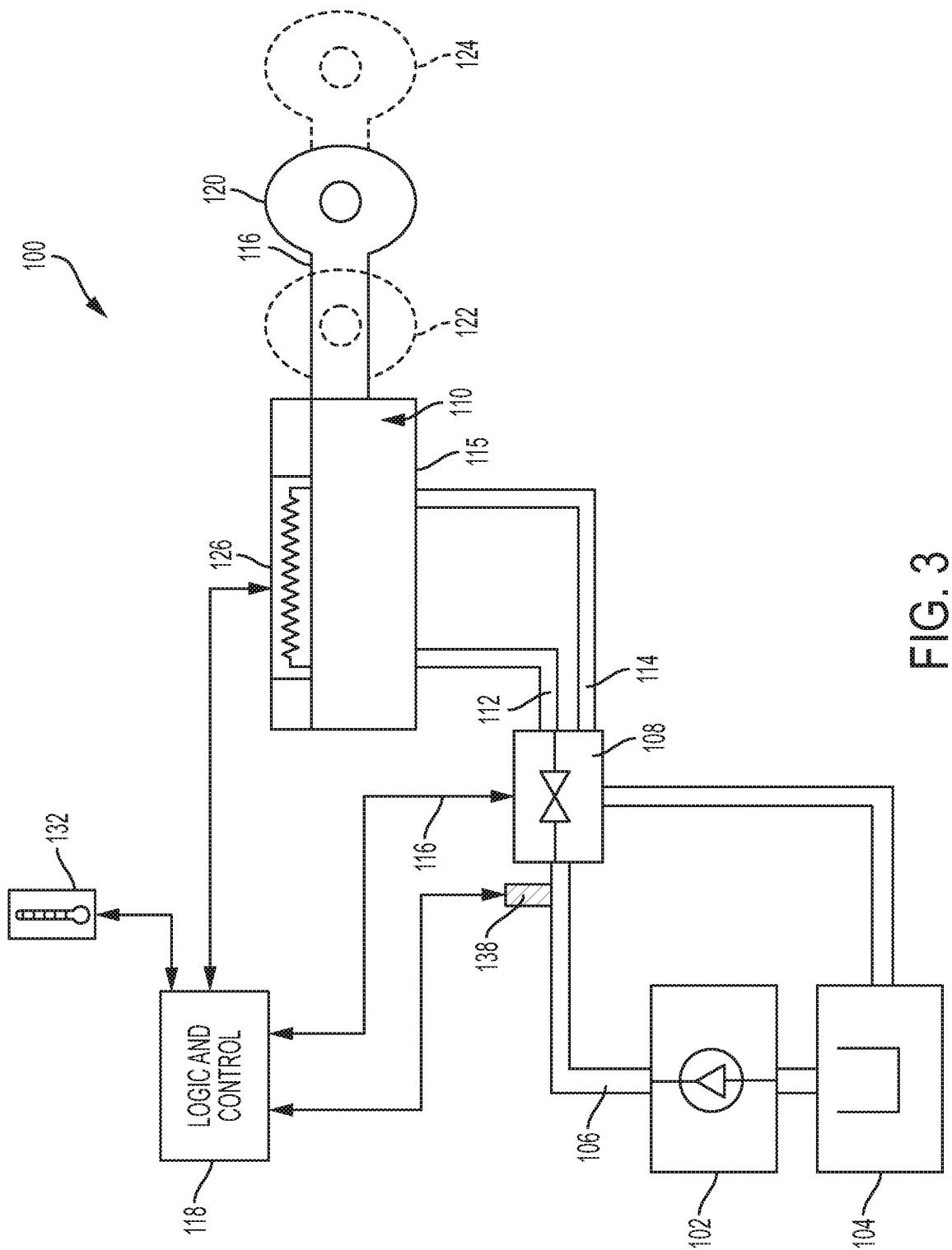
FIG. 3 is diagrammatic schematic view of a system for operating a ballast car hopper door in accordance with an exemplary embodiment of the present invention.

Turning to FIG. 3, a schematic diagram of a hydraulic hopper door control system in accordance with an exemplary embodiment of the present invention is referenced generally by the numeral 100. The hopper door control system includes a hydraulic pump 102 in fluid communication with a hydraulic fluid reservoir 104 so that the pump is operable to provide pressurized hydraulic fluid to the system. The pressure outlet 106 of the pump 102 is in fluid communication with an electro hydraulic servo valve 108 operable to direct pressurized hydraulic fluid to a linear actuator 110 through valve ports 112, 114 supplying pressurized hydraulic fluid to the actuator body or housing 115 to extend and retract actuator piston or ram 116 relative to the actuator body 115. Logic and control circuitry 118 is in electrical communication with the servo valve 108, with a signal from the logic and control circuitry 118 commanding the valve to a desired position to achieve a desired movement of the actuator 110 and in particular movement of ram 116 relative to actuator body 115. As depicted in FIG. 3, the actuator 110 can be commanded to a mid-position 120, a retracted position 122, and an extended position 124, with the servo valve 108 directing pressurized hydraulic fluid to the appropriate ports 112, 114 to achieve the desired positioning of the actuator 110. A door position sensor 126 positioned internally or externally to the actuator 110 is in communication with the logic and control circuitry 118 and is operable to provide an electrical signal to the circuitry corresponding to the position of the ram 116 of the actuator 110 relative to the actuator body 115.

The system 100 further includes: a temperature sensor 132 operable to provide a signal to the logic and control circuitry 118 corresponding to the ambient temperature in which the system is operating and a pressure transducer 138 operable to provide an electrical signal corresponding to the hydraulic system pressure to the logic and control circuitry 118.

It should be understood that the hydraulic actuator 110 and logic and control circuitry 118 correspond to the actuator and logic and control circuitry discussed with respect to the exemplary embodiment of FIGS. 1-2.

It should be further understood that the arrangement and configuration of the system depicted in the schematic diagram of FIG. 3 is exemplary and not limiting, and that variations on that configuration are within the scope of the present invention. For example, the system may include additional components and/or sensors than those depicted—the hydraulic system may include an accumulator, or the components may be positioned and arranged other than as depicted in the schematic diagram. Similarly, the positioning and arrangement of the temperature and pressure sensors may vary within the scope of the present invention. For example, the pressure sensors may be positioned directly adjacent the ports of the hydraulic actuator.

Additionally, the system may include fewer or more sensors than those depicted in the exemplary schematic diagram of FIG. 3, such as including additional pressure sensors, flow sensors, and temperature sensors. Furthermore, variations in the types of sensors employed in the system are contemplated by the present invention. For example, while the actuator position sensor is depicted as a resistive element, other types of sensors, such as encoders or linear variable differential transformer (LVDT) sensors may likewise be employed, with the position sensor located internally or externally to the actuator. In alternative embodiments, the position sensor may be a rotary sensor placed on the hopper door pivot or on the linkage mechanism. It should be understood that as used herein, "door position" and "actuator position" may be used interchangeably as the door is mechanically coupled to the actuator such that they move in tandem. Thus, the position of the door is directly related to the position of the ram 116 of the actuator 110 such that the door position sensor may physically be located on or in either the actuator 110 or the door 20. These and other variations are within the scope of the present invention.

With the components and sensors of the hopper door control system set forth, exemplary operation of the hopper door system will now be described with reference to the flow diagram depicted in FIGS. 4 and 5, and with reference back to the system depicted in FIGS. 1-3 as described above. It should be understood that the logic and steps of operation depicted and described in FIGS. 4 and 5 are preferably implemented in the logic and control circuitry of the system described above, and that the logic and control circuitry is in communication with the sensors and components of the system as previously described.

Figure 4:
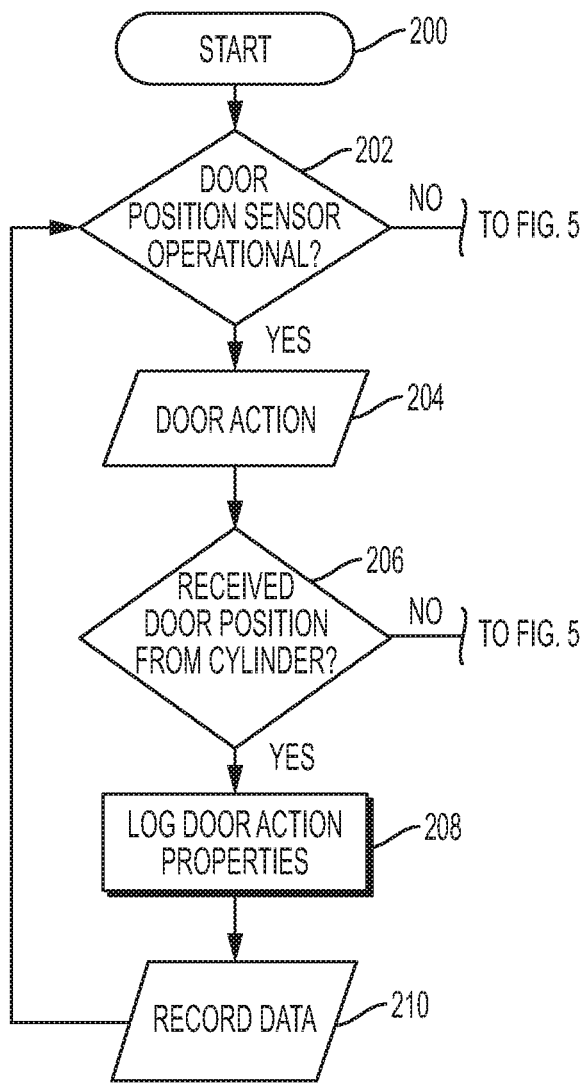
FIGS. 4 and 5 are flow diagrams depicting a method for controlling a ballast car hopper door in accordance with an exemplary embodiment of the present invention.
Figure 5:
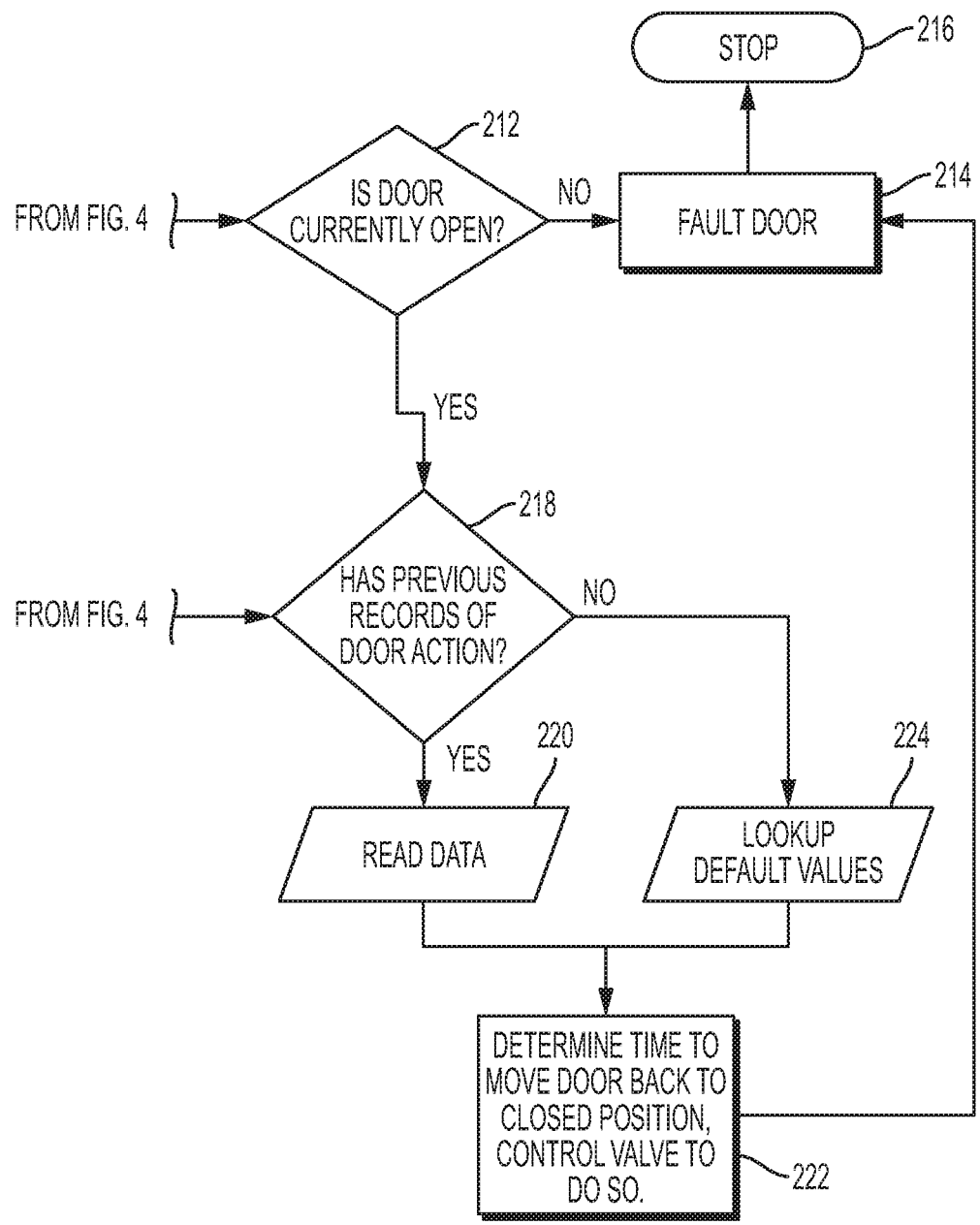

Looking to FIG. 4, the process starts at step 200, either when the logic and control circuitry is turned on or initiated, or when the master controller 40 commands the logic and control circuitry 26 to perform an operation, i.e., issues a command to move the hopper car door 20 to a desired position.

At step 202, the logic and control circuitry 26 determines whether the hopper door position sensor 126 is operational.

Operability of the sensor 126 can be determined by various measurements and logical comparisons performed by the logic and control circuitry 26 with respect to the electrical signals supplied to, and received from, the sensor 126. In the case of a resistive or inductive type position sensor, the circuitry 26 can detect an open circuit or short circuit, can detect whether the supply voltage to the sensor is within a desired range, or can detect if the position signal voltage is outside of an allowable tolerance. In the case of an encoder type position sensor, the circuitry can detect operable communication with the sensor and can detect any fault codes sent by the sensor. Regardless of the type of sensor 126, if the logic and control circuitry 26 determines that the door position sensor 126 is operating properly, the process proceeds to step 204.

At step 204, the logic and control circuitry commands the hopper door 20 (via a command to the servo valve 108 and corresponding movement of the actuator 110) to a desired position for distributing ballast from the hopper—by moving the hopper door 20 inwardly or outwardly to an open position—or for containing ballast—by moving the hopper door 20 to its center, closed position.

Proceeding to step 206, with the command to move the door 20 issued, the logic and control circuitry monitors the door position sensor 126 to ascertain that the door begins to move after being commanded to do so. If so, at step 208 the logic and control circuitry 26 monitors and records system parameter data from the sensors located throughout the system, preferably including the door position sensor 126, the system hydraulic pressure transducer 138, the ambient temperature sensor 132, and combinations thereof. All of the system parameter data from the various sensors is initially captured and recorded into memory located in the logic and control circuitry 26, or in communication with the logic and control circuitry. A time signal is recorded simultaneously with the sensor data so that each recorded data point for each system parameter can be temporally correlated with the other recorded data points so that a timeline of the reaction of the system parameters during the course of the commanded operation can be constructed.

Upon completion of the commanded movement, at step 210 the logged data is saved into a data record that indicates the commanded operation and the time and date of the operation. The recorded data record is preferably stored to a non-volatile memory within the logic and control circuitry 26. Most preferably, the recorded data is also transferred from the logic and control circuitry to an external storage device or computer system for permanent storage and for further analysis and processing.

With the desired movement of the hopper door commanded and completed, the process returns to step 202 to monitor the operability of the door position sensor 126.

Looking again to block 202, if the logic and control circuitry 26 determines that the door position sensor 126 is not operational, the process proceeds to step 212 of FIG. 5, where the logic and control circuitry 26 determines whether the hopper door 20 is currently in an open state or a closed state. Determination of the position of the door 20 can be based on the current data from the door position sensor 26, the last known state of the door 20, by determining whether vertical pressure is on the door based on the load condition of the car preprogrammed or sensed by the logic and control circuitry, or by combinations of those data points. If it is determined that the door 20 is currently in a closed position, no ballast is being discharged from the hopper 16, so the door 20 can be left at that position.

At step 212, with the door position sensor 126 failed and the door 20 not currently open, the process proceeds to step 214 where the logic and control circuitry 26 notes a fault in the door system (i.e., the failed door position sensor 126), and sets a flag in the logic and control circuitry 26 that the ballast hopper car position sensor 126 has a fault. At step 216 further operation of that hopper door 20 is stopped until the system can be repaired. Preferably, the fault flag identifies the particular ballast hopper door 20 that was determined to be inoperable. Most preferably, the logic and control circuitry 26 further communicates the detected fault to a master controller 40.

Returning to step 212, with the logic and control circuitry 26 having detected that the door position sensor 126 is not operational and that the hopper door 20 is currently open, ballast is potentially being erroneously discharged from the hopper car 12. Thus, the logic and control circuitry 26 will attempt to operate and close the door 20 in the absence of an operable door position sensor 126.

At step 218 the logic and control circuitry 26 determines whether there exists any previously recorded data corresponding to the desired operation—i.e., moving the hopper door 20 from an open position to a closed position—as would have been recorded as described with respect to steps 204 through 210 of the process.

If the logic and control circuitry 26 determines that there is previously recorded data for the desired operation, at step 220 that previously recorded data is moved or read into memory of the logic and control circuitry. At step 222, the logic and control circuitry 26 determines from the previously recorded data the time it previously took to move the hopper door 20 from the open to the closed position, and issues a command to the servo valve 108 for that same amount of time, commanding the hopper door 20 to the closed position. While that command is executing, i.e., as the hopper door 20 is moving to the closed position, the logic and control circuitry 26 compares the real-time system parameter data—e.g., the hydraulic pressure—to the data recorded from the previous correct operation of closing the hopper door 20.

If the real-time system parameter data correlates to the corresponding recorded system parameter data within an allowable tolerance, the logic and control circuitry 26 determines that the hopper door 20 closed properly. For example, the data recorded during normal operation of the hopper door may indicate a pressure drop at the initial movement of the hopper door, and a gradual pressure increase when the hopper door reaches the closed position—all occurring over a specific time interval. If the real-time data correlates closely to that recorded data, e.g., the initial pressure drop and final pressure spike, all over the same time period, are within an allowable tolerance, then the logic and control circuitry determines that the hopper door has closed correctly.

In one exemplary embodiment, the logic and control circuitry differentiates between the operation of hopper door when the ballast car is loaded with material, and when the ballast car is not loaded, or empty. For example, when the ballast car is loaded with ballast material, that material exerts a force, or vertical pressure, against a closed hopper door. When the door is commanded open from that closed position the pressure of the material against the door causes the door to move less slowly than when there is no material in the car and thus no vertical pressure exerted on the hopper door. Similarly, a door commanded to a closed position moving against the pressure of a ballast load will move more slowly than a door moving against no load. Thus, preferably, the logic and control circuitry is preprogrammed with information as to the load status of the car, and the expected timing of movement of the door is accounted for by the logic and control circuitry. In alternative embodiments, the logic and control circuitry receives real-time or updated information regarding the load status of the hopper car and adjusts the door timing parameters accordingly.

With the door 20 thus moved to the closed position, the process proceeds to step 214, where the fault with the position sensor 126 is flagged.

Returning to step 218, if the logic and control circuitry 26 has not previously recorded system parameter data for a corresponding normal door operation, the process proceeds to step 224 where predetermined default values for the system parameter data are used to compare to real-time system parameter data to determine whether the subsequent hopper door 20 closing operation is successful. Preferably, the predetermined default values are derived from data recorded from hopper door test systems or from other hopper door systems in operation. Alternatively, the default values can be calculated or estimated.

In alternative embodiments, the system and method of the present invention allow full operation of a ballast car hopper door 20—i.e., moving the door to any desired open or closed position—in the event of failure of the door position sensor 126.

In further embodiments, the system and method allow full operation of a ballast car hopper door in a system that does not include a door position sensor.

In those alternative embodiments, profiles of recorded system parameter data under various operating conditions—such as varying temperatures, ballast loads, etc.—are obtained for various operations of the hopper door and stored in memory accessible by the logic and control circuitry. For example, moving the hopper door from the closed position to the open inboard position and vice versa, moving the hopper door from the closed position to the open outboard position and vice versa, moving the hopper door from the open inboard to the open outboard position, and any other variations of operation desired. During operation of the door the real-time system parameter data—e.g., pressure and temperature—is compared to the system parameter data recorded in the corresponding profile. If the real-time system parameter data compares within an allowable tolerance to the recorded system parameter data, the logic and control circuitry determines that the commanded door operation was successful. Thus, in a system that does not include a door position sensor, the hopper door can be controlled using recorded system parameter data.

In further alternative embodiments, the recorded data is offloaded to an external computer system and analyzed and/or averaged to obtain default values for use by the logic and control circuitry in the event no operation of the door system has yet been recorded. In other embodiments, the system includes further sensors, such as additional pressure, flow, and temperature sensors which provide additional data to the logic and control circuitry that is used in the recorded system parameter data profile in a manner similar to that just described.

From the above, it can be seen that the system and method of the present invention can be employed to ensure that a hopper door can be closed in the event of a fault with a door or actuator position sensor to ensure that ballast is not erroneously discharged during that failure, and can be used to control the operation of a hopper door in a system without a door position sensor.

While the system and method of the present invention have been described herein with respect to a hopper door system comprising a linear hydraulic actuator, it should be understood that the system and method of the present invention may similarly be employed in conjunction with other system configurations and power sources. For example, the hopper door actuator may be electrically or pneumatically operated, or the actuator may be a rotary actuator configured to directly rotate the hopper door into a desired position. In an electrically actuated system voltage and current parameters may be monitored and recorded rather than pressure parameters, however the operation of the system and method remains essentially unchanged.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure and in the claims below is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of the claims.

What is claimed is:

1. A system for operating a ballast car hopper door, comprising:
    an actuator mechanically coupled to a hopper door such that the actuator moves the hopper door between open and closed positions;
    a position sensor coupled to the hopper door wherein the position sensor generates an electrical signal corresponding to a position of the hopper door;
    at least one system sensor operable to measure at least one system parameter corresponding to movement of the hopper door, wherein the at least one system parameter is not a position of the hopper door; and
    logic and control circuitry in communication with the position sensor and the system sensor, wherein the logic and control circuitry comprises a processor and a memory device having stored thereon executable instructions that, when executed by the processor, cause the system to perform operations comprising:
        obtaining data from the position sensor;
        determining whether the position sensor is functioning properly using the data obtained from the position sensor;
        commanding the actuator to move the hopper door to a desired position; and
        upon determining that the position sensor is not functioning properly, monitoring real-time data from the at least one system sensor as the hopper door moves and comparing the real-time data to corresponding stored data to determine that the hopper door moved as commanded.

2. The system of claim 1, wherein the at least one system sensor is selected from the group consisting of: pressure sensors, flow sensors, temperature sensors, voltage sensors, current sensors, and combinations thereof.

3. The system of claim 1, wherein the logic and control circuitry further causes the system to perform operations comprising:
recording into memory real time data from the at least one system sensor as the hopper door moves.

4. The system of claim 3, wherein the logic and control circuitry further causes the system to perform operations comprising:
recording into memory a time signal to temporally correlate data recorded from the at least one system sensor.

5. The system of claim 1, wherein the stored data is derived from previously-recorded data obtained from the at least one system sensor.

6. The system of claim 1, wherein the stored data is predetermined calculated data.

7. A system for operating a ballast car hopper door, comprising:
an actuator mechanically coupled to the hopper door to move the hopper door between open and closed positions;
at least one system sensor operable to measure at least one system parameter corresponding to movement of the hopper door, wherein the system parameter is not a position of the hopper door; and
logic and control circuitry in communication with the system sensor, wherein the logic and control circuitry comprises a processor and a memory device having stored thereon executable instructions that, when executed by the processor, cause the system to perform operations comprising:
commanding the actuator to move the hopper door to a desired position; and
monitoring real-time data from the at least one system sensor as the hopper door moves and comparing the real-time data to corresponding stored data to determine that the hopper door moved as commanded.

8. The system of claim 7, wherein the at least one system sensor is selected from the group consisting of: pressure sensors, flow sensors, temperature sensors, voltage sensors, current sensors, and combinations thereof.

9. The system of claim 7, wherein the logic and control circuitry further causes the system to perform operations comprising:
recording into memory real time data from the at least one system sensor as the hopper door moves.

10. The system of claim 9, wherein the logic and control circuitry further causes the system to perform operations comprising:
recording into memory a time signal to temporally correlate data recorded from the at least one system sensor.

11. The system of claim 7, wherein the stored data is derived from previously-recorded data obtained from the at least one system sensor.

12. The system of claim 7, wherein the stored data is predetermined calculated data.

13. A system for operating a ballast car hopper door, comprising:
an actuator mechanically coupled to a hopper door;
at least one system sensor operable to measure at least one system parameter corresponding to movement of the hopper door;
logic and control circuitry in communication with the system sensor, wherein the logic and control circuitry comprises a processor and a memory device having stored thereon executable instructions that, when executed by the processor, cause the system to perform operations comprising:
commanding the actuator to move the hopper door to a desired position; and
monitoring real-time data from the at least one system sensor as the hopper door moves and comparing the real-time data to corresponding stored data to determine that the hopper door moved as commanded.

14. The system of claim 13, wherein the at least one system sensor is selected from the group consisting of: pressure sensors, flow sensors, temperature sensors, voltage sensors, current sensors, and combinations thereof.

15. The system of claim 14, wherein the logic and control circuitry further causes the system to perform operations comprising:
recording into memory real time data from the at least one system sensor as the hopper door moves.

16. The system of claim 15, wherein the logic and control circuitry further causes the system to perform operations comprising:
recording into memory a time signal to temporally correlate data recorded from the at least one system sensor.

17. The system of claim 13, wherein the stored data is derived from previously-recorded data obtained from the at least one system sensor.

18. The system of claim 13, wherein the stored data is predetermined calculated data.

19. The system of claim 13, further comprising a position sensor coupled to the hopper door and in communication with the logic and control circuitry, the position sensor providing an electrical signal corresponding to a position of the hopper door to the logic and control circuitry.

* * * * *